Patented Oct. 24, 1939

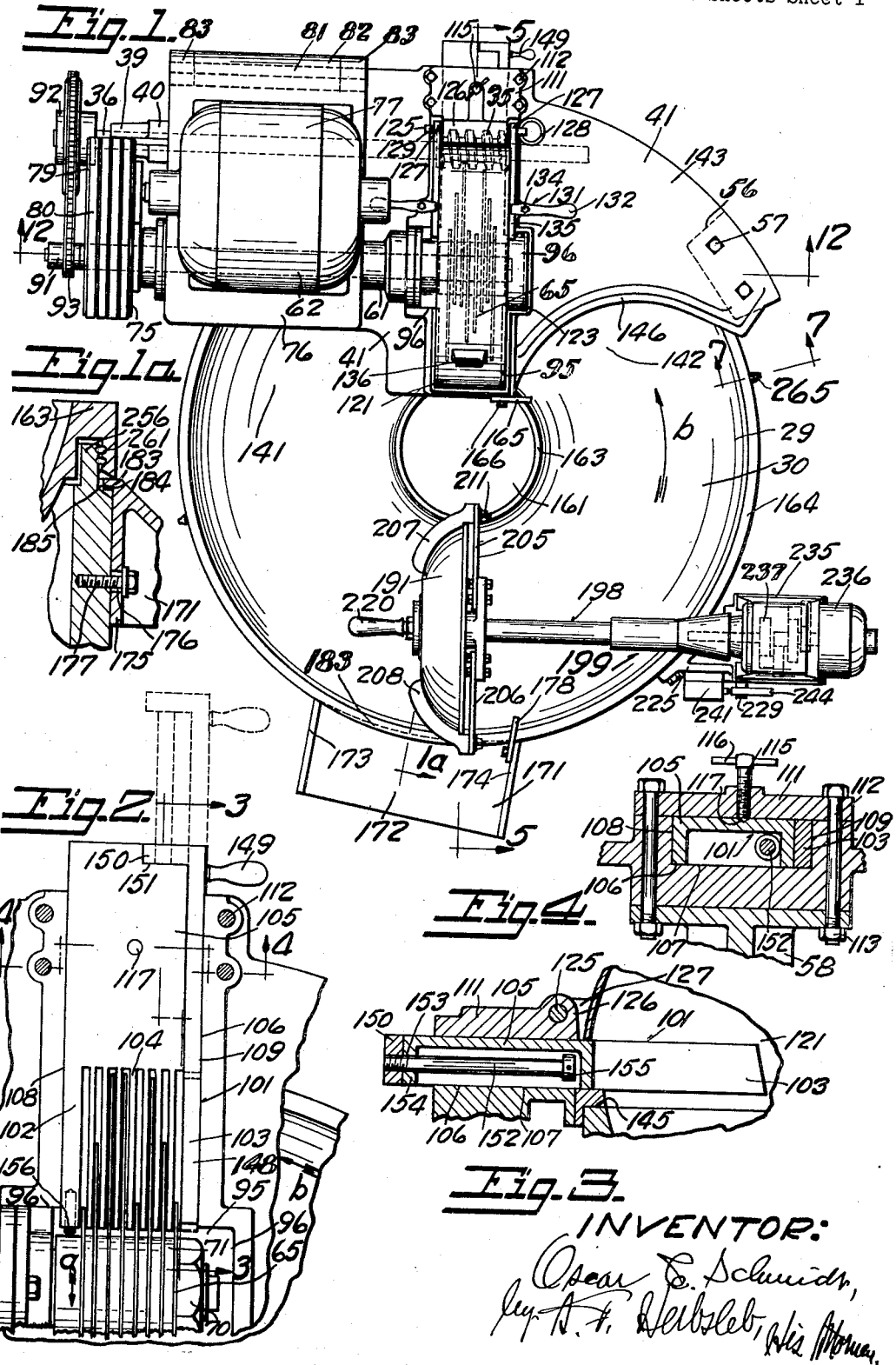

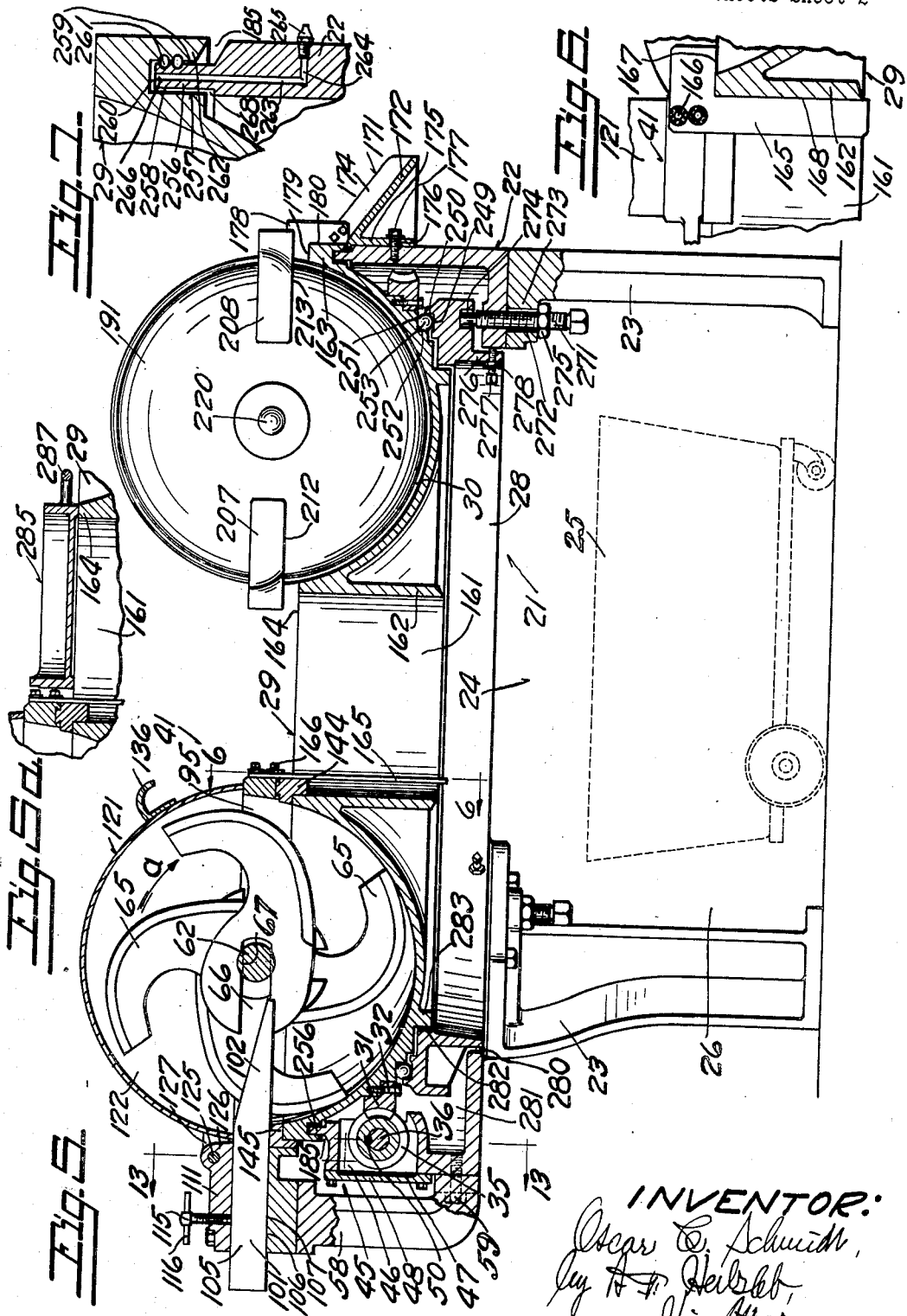

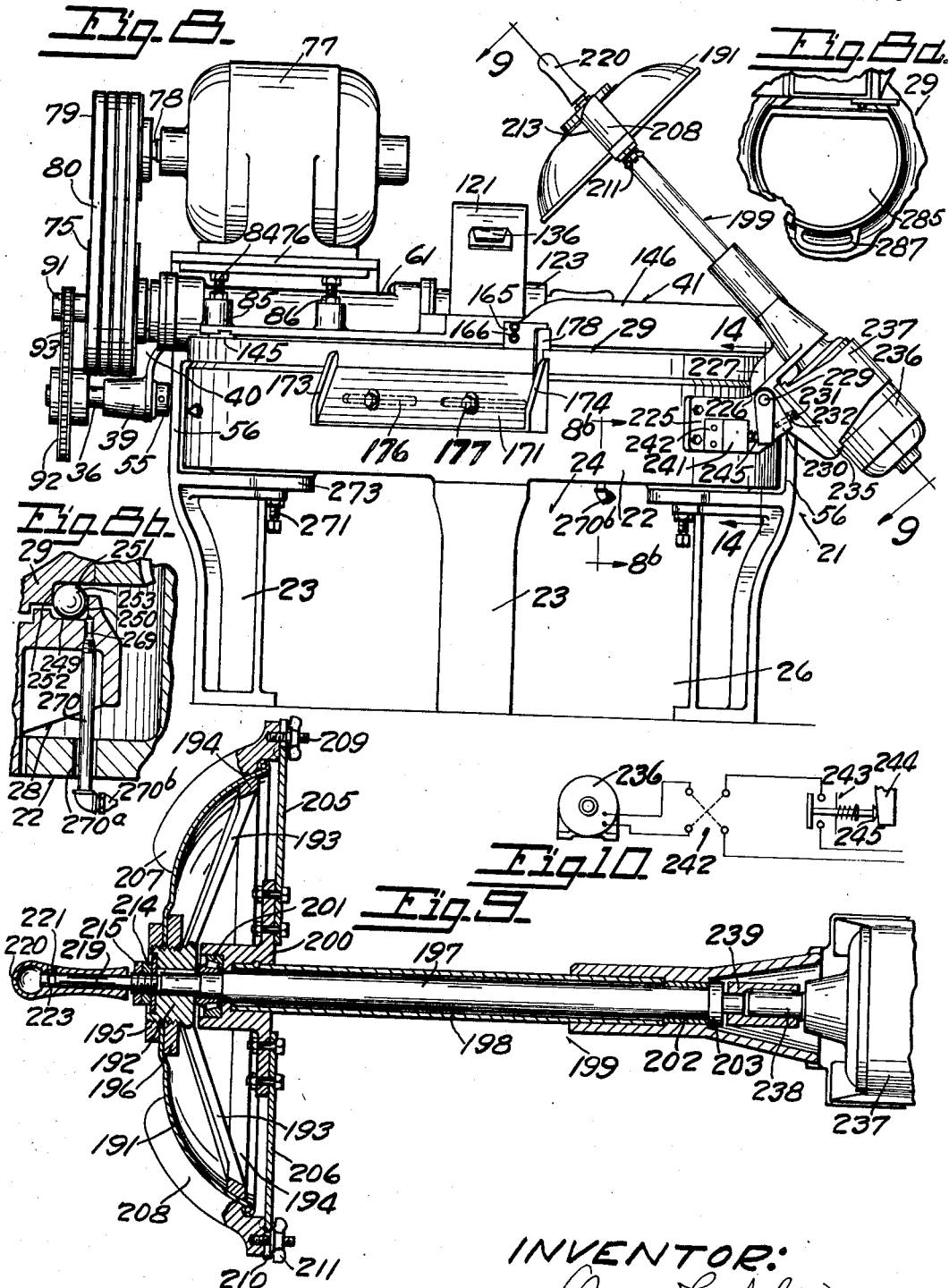

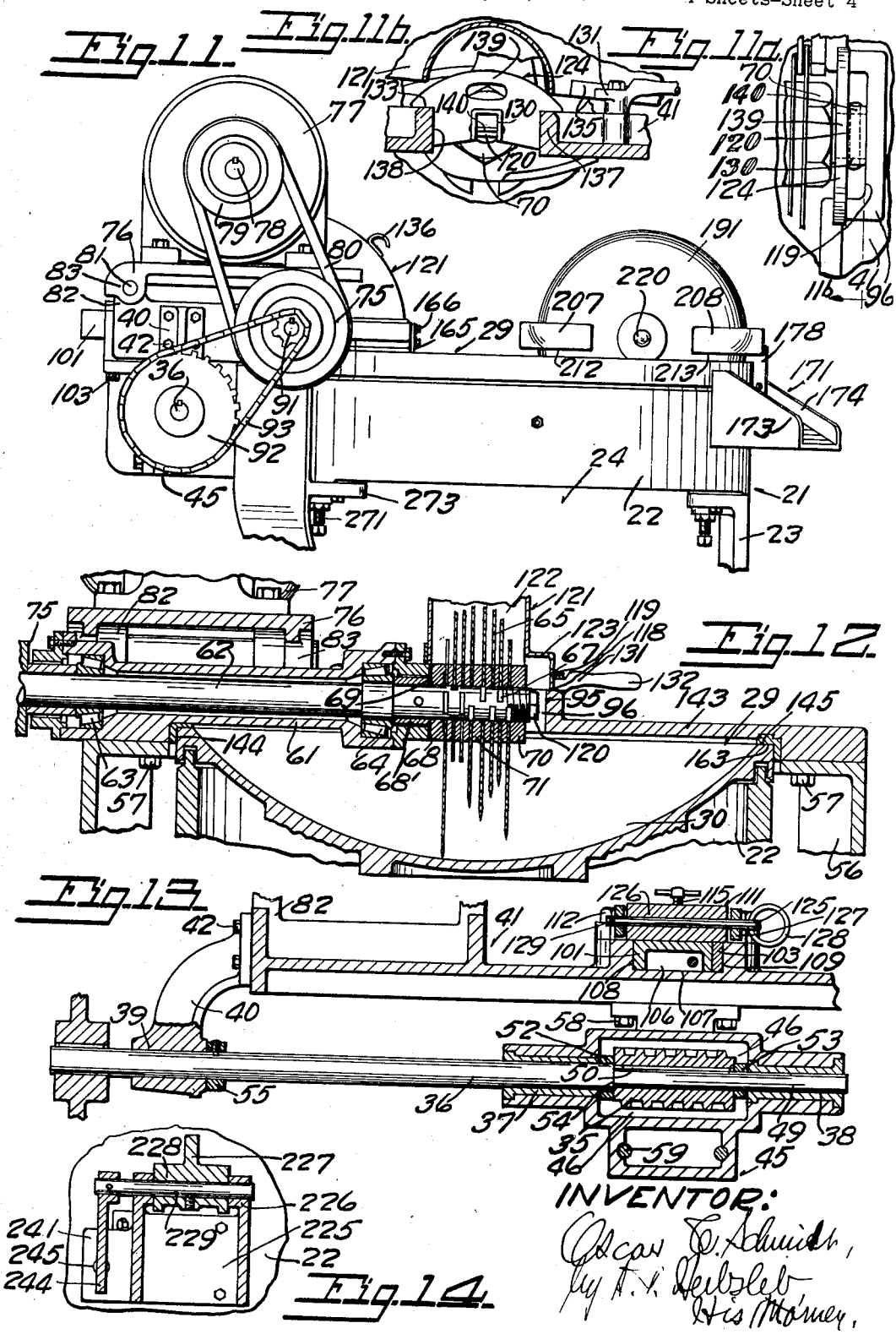

2,177,600

UNITED STATES PATENT OFFICE 2,177,600

CUTTING MACHINE

Oscar C. Schmidt, Cincinnati, Ohio, assignor to The Cincinnati Butchers' Supply Company, Cincinnati, Ohio, a corporation of Ohio Application July 21, 1937, Serial No. 154,843

26 Claims. (Cl. 146—67)

My invention relates principally to machines for cutting meat, meat dough and the like in the butchering industry, but it is to be understood that the same or parts thereof are also applicable to other cutting machines. The material operated on is for convenience hereinafter referred to as meat. My invention contemplates the employment of a rotary bowl provided with a meat trough in which cutting means act to cut the meat.

It is one of the principal objects of my invention to provide novel means whereby to cut and discharge the meat without contact therewith by the human hands, and to place the point of discharge selectively at the point where it may be most convenient, depending on the location of the machine with relation to walls and other machinery, or as may be most convenient for the operator.

My invention consists in providing novel means for discharging the cut or minced meat; further, in providing novel means whereby to discharge the cut meat at the inner portion of the bowl; further, in providing novel means whereby the meat may be selectively discharged at the inner portion or the outer portion of the bowl; further, in providing novel means whereby to dischargingly move the meat in opposite directions out of the bowl; further, in providing novel means for controlling the movement of the meat at the cutters for directing the meat into the cutting sphere of the cutters; and, further, in providing novel means for aiding the movement of the meat with the rotating bowl while being acted on by the rotary cutters.

My invention consists, further, in providing novel means for mounting and relating the driving mechanism for the operating parts of the machine to facilitate the discharge of the meat from the bowl selectively at the inner portion and the outer portion of the bowl; further, in providing novel means for adjusting the position of the bowl; and, further, in providing novel means whereby to separate the material contacted portions of the bowl from the supporting and actuating parts thereof so as to avoid the introduction of meat juices into said supporting and actuating parts and to prevent the introduction of lubricants from said supporting and actuating parts into the meat contacting portions of the mechanism.

The meat industry is subject to Federal inspection under the jurisdiction of the Bureau of Animal Industry, whose rules eliminate manual handling of meat wherever possible and require extreme sanitation. My present invention is in furtherance of such rules.

My invention will be further readily understood from the following description and claims, and from the drawings, in which latter:

Fig. 1 is a plan view of my improved device.

Fig. 1a is a sectional detail view taken on the line 1a of Fig. 1.

Fig. 2 is a plan view of the comb for the cutter blades and its mounting and showing the movable tongue thereof in operative position in full lines, and in retracted position in dotted lines.

Fig. 3 is a longitudinal section detail view of the same, taken on the irregular line 3—3 of Fig. 2.

Fig. 4 is a cross-sectional detail view of the same, taken on the irregular line 4—4 of Fig. 2.

Fig. 5 is a vertical axial section of my improved device, taken on the line 5—5 of Fig. 1.

Fig. 5a is a similar vertical section showing the temporary closure for the central discharge opening in place.

Fig. 6 is a cross-sectional detail view taken on the line 6—6 of Fig. 5, showing the scraping means for the inner margin of the bowl.

Fig. 7 is a cross-sectional detail view showing the lubricating means for the outer margin of the bowl, taken on the line 7—7 of Fig. 1.

Fig. 8 is a front elevation of my improved device, showing the rotary unloader in inactive or raised position.

Fig. 8a is a plan view detail showing the closure for the central discharge opening in place, partly broken away.

Fig. 8b is a vertical section, taken on the line 8b—8b of Fig. 8, showing a detail of the lubricating means for the friction reducing bearing.

Fig. 9 is an axial section of the unloader, taken on the line 9—9 of Fig. 8, and partly broken away.

Fig. 10 is a diagrammatic view of the electrical circuits for the reversible rotary unloader.

Fig. 11 is an end view of my improved device, partly broken away.

Fig. 11a is a plan view detail of the cutter shaft holding means.

Fig. 11b is a vertical section of the same, taken in the plane of the line 11b of Fig. 11a.

Fig. 12 is a vertical section taken on the line 12—12 of Fig. 1, partly broken away, showing the cutter shaft mounting.

Fig. 13 is a vertical section taken in the plane of the irregular line 13—13 of Fig. 5, and partly broken away, showing details of the mountings for the worm shaft, the hood and the comb; and, Fig. 14 is a vertical section taken on the line 14—14 of Fig. 8, showing the mounting means for the pivoted unloader, partly broken away.

A frame 21 comprises a housing 22 which is of general annular form, and legs 23 depending therefrom. Three of these legs are shown arranged so as to provide a clear space 24 under the housing for the introduction of a receptacle 25 for receiving the cut material and for providing spaces 26 between the legs of the machine through which the receptacle may be rolled or otherwise introduced into position for receiving the cut material from an inner discharge.

A supplemental frame 28 is located in the main frame and a bowl 29 is rotatable on the supplemental frame. The supplemental frame is shown intermediate between the main frame and the bowl. The bowl is provided with a trough 30 for the meat, the bowl and the trough being shown annular. The bowl is provided with a worm ring gear 31, shown formed separately from the bowl and rigidly secured thereto by bolts 32. A worm 35 meshes with the ring gear and is mounted on a shaft 36 journaled in bearings 37, 38 in the housing 22 and in a bearing 39 on a bracket 40 secured to a cover 41 by bolts 42 (Figs. 5 and 13).

The bearings 37, 38 for the worm shaft are shown as solid bearings in a rearwardly extending bulge 45 of the housing 22. The worm is located and held endwise between the ends of said bearings in a cavity 46 of said bulge, the cavity being provided with a rear opening 47 normally closed by a removable plate 48, the worm being insertible into and removable from said cavity when assembling and dismantling the structure.

The worm shaft has a reduced inner end 49 which is journaled in the bearing 38, which is of less diameter than the bores of the bearings 37 and 39, and which is also received in the bore of the worm 35, the reduced end of said shaft in said last-named bore being provided with a key 50 received in a groove in the wall of said bore to form driving connection with said worm. The portion of the shaft in the bearing 37 has a radius as great as the radius between the axis of said shaft and the outer face of said key, so that the shaft may be slid endwise outwardly out of said worm and out of its bearings for disassembling the parts, and may be inserted thereinto for assembling the parts, the worm being loose in the cavity 46 when the shaft is moved endwise therefrom so that the worm may be removed through the opening 47 or may be inserted and manipulated through said opening when assembling the parts.

A spacing collar 53 is located between the inner end of the bearing 38 and one end of the worm, the other end of the worm being positioned by a shoulder 54 between the reduced end of the shaft and its portion of greater diameter. A positioning collar 55 is releasably secured to said shaft and abuts the inner end of the bearing 39 in order to operatively position the shaft and the worm endwise. A spacing collar 52 is located about the shaft between the worm and the bearing 37, the spacing collars 53, 52 positioning the worm endwise between the bearings 37, 38. The cavity 46 forms a lubricant reservoir to supply the worm with grease.

The cover 41 is located over the rear portion of the bowl. Its lateral portions are secured to upward extensions 56 of the rear legs of the frame by bolts 57, and its rear portion is supported on a bracket 58 extending upwardly from the bulge 45 of the main frame, to which the bracket is secured by bolts 59, the rear portion of the cover being secured to this bracket.

The cover is provided with a tunnel 61, in which a cutter shaft 62 is located, the cutter shaft being journaled in bearings 63, 64 shown as oppositely presented taper roller bearings, the inner and outer raceways of which are respectively endwise positioned on said shaft and in said tunnel, suitable adjustable means being provided for endwise positioning in said bearings (Figs. 5 and 12).

This cutter shaft has a series of cutter blades 65 secured in spaced relation thereon so as to rotate therewith, as by having each of the cutter blades provided with a slot 66, the walls of which slots are received in opposite grooves 67 in the cutter shaft, the bottoms of the grooves and the walls of the slots coacting to securely position the blades angularly on the cutter shaft, successive blades being positioned at progressive angles about the shaft. A thrust collar 68 is located at one end of the series of blades by a bushing 68' contacting a shoulder 69 on said shaft. A clamp collar 70 is located at the other end of the blades, and spacing collars 71 are located between the blades. The clamp collar is screwed over the threaded inner end of the cutter shaft for clamping the blades to said shaft. The grooves 67 are substantially wider than the walls of the slots 66 for permitting such clamping. The cutter shaft has an overhanging end overhanging the cover and the frame, to which a pulley 75 is secured.

A motor supporting plate 76 is adjustably mounted on one end of the cover and has an electric motor 77 secured thereto (Figs. 1, 8 and 11). The roller shaft 78 of the motor has a pulley 79 secured thereto which overhangs the cover and the frame. Flexible driving connections 80, as a V belt drive are received about the pulleys 75, 79 for driving the cutter shaft. The plate 76 is adjusted up and down whereby to tension the flexible driving connections for proper driving contact with their pulleys. The plate is shown pivoted to the cover on a pivot rod 81 in bearings 82 on the cover, the motor supporting plate having bearings 83 about the pivot rod. Adjusting bolts 84 are threaded in threaded lugs 85 on the cover and have jam nuts 86 about them for securing the bolts in adjusted positions, the adjustable end of the motor supporting plate resting on said bolts.

The overhanging end of the cutter shaft has a sprocket pulley 91 secured thereto, and the overhanging end of the worm shaft has a sprocket pulley 92 secured thereto, a flexible chain belt 93 being received over said pulleys and driving the worm shaft from the cutter shaft.

The cover 41 is provided with a radially extending opening 95, having laterally extending bays 96. The rotary blades project through said opening, and the bays accommodate the securing means on said shaft for the respective ends of the set of blades (Figs. 1, 2, 3, 4 and 5).

A comb 101 is received in said opening, the comb having wider end tongues 102, 103 at the respective ends of said set of blades and intermediate narrower tongues 104 received in the spaces between neighboring blades. The comb has a base 105 which is located in a shallow extension 106 of the opening 95, said extension having a bottom 107 on which the base of the comb is supported. The said opening and its extension have side walls 108, 109, between which the respective ends of the comb are positioned and guided. A comb cap 111 is received over the comb, bolts 112 extending through holes in said cap and registering holes in the side walls of said shallow extension 106 and in registering holes in laterally extending lugs in the bracket 58, nuts 113 being received over the threaded ends of said bolts for clamping the comb cap to the cover and clamping the rear portion of the cover to the frame, the comb having a sliding fit in the channel thus formed at the rear end of the transverse opening in the cover. A bolt 115 is threaded in the comb cap and is provided with a handle 116 and a pointed end received in a locating socket 117 in the comb to securely position the comb in the cover in proper relation to the cutter blades.

An arcuate hood 121 having an inner arcuate cavity 122 and a lateral bay 123, corresponding in position with the transverse opening 95 and one of the lateral bays 96 when the hood is in down position, is located on the cover above said transverse opening and lateral bay in the cover, and is mounted so as to be moved out of the way of the blades for inspection and attention to the blades and the operative mechanism in association therewith if desired. The hood is shown hinged to the cap plate 111 by a hinge pin 125 in a bearing 126 on the cap plate and in bearings in rearwardly projecting lugs 127 projecting rearwardly from the hood at the respective ends of the bearing 126 for laterally positioning the hood. The hinge pin is provided with a handle 128 for its ready removal and with a cotter pin 129 for holding the same in place.

Hood clamps 131 having handles 132 are pivoted to the cover at the respective sides of the hood on shoulder bolts 134 threaded into lugs in the cover, the clamping fingers of the clamps having cam faces received over laterally extending lugs 135 on the respective sides of the hood. The hood is provided with a handle 136 by means of which to raise and lower the same.

All lower edges of the hood are tightly clamped against the cover for providing tight joints 118 therewith to prevent the escape of meat and meat juices therethrough, providing an inner overhanging end of the cutter shaft permitting this arrangement at said end, whereby a closed end wall 119 is presented toward the overhanging end of the cutter shaft and cutters (Figs. 1, 3, 5 and 12).

The inner end of the cutter shaft is provided with means to lock the same in non-rotative position when it is desired to clamp the cutters on the shaft and for other purposes (Figs. 11a, 11b and 12), and such means are arranged in such manner as to provide an obstruction to the closing of the hood when such means are in operative position, such means being further arranged to be moved out of such obstructing position when releasing the cutter shaft.

Thus the end of the cutter shaft is formed cross-sectionally at 120 to receive an obstructing part, being shown square in cross-section and arranged to receive a wrench 124 thereover. The wrench has a correspondingly formed part, shown as a recess 130 having angular walls to engage the angular walls of the end of the shaft, the recess being open at one side to allow the wrench to be slipped over the end of the shaft in lateral direction.

The wrench is also provided with shoulders 133 which engage the upper faces of the opposite walls 137 of the bay 96, into which latter the end of the cutter shaft extends. It also has end shoulders 138 which engage the inner faces of said opposite walls, the shoulders 133, 138 being arranged to locate the wrench and prevent its being turned. The wrench is also provided with an upwardly extending handle 139. The walls of the recess 130 extend endwise, the extreme ends thereof engaging the end wall 119 of the bay 96, and the wrench is provided with a pin 140 rigid therein which engages the end of the cutter shaft, to position the wrench and the cutter shaft endwise.

The wrench when in position to hold the shaft is an obstruction to the closing of the cover, as shown in Fig. 11b, so that the operator must first remove the wrench before he can close the cover, which latter is a prerequisite to starting the machine, thus avoiding accident.

It will be noted that the cover is provided with rearwardly extending recesses 141, 142 at its forward edge in order to expose as much as possible of the trough of the bowl to view (Figs. 1 and 12). The cover is provided with a lower face or web 143 to confine the material in the trough of the bowl while being fed past the cutters, there being preferably confining joints 144 and 145 respectively between the outer and inner peripheral edges of the bowl and the bottom wall of said cover, in order to prevent the oozing of the meat and meat juices out of the bowl. The infeeding transverse edge of the cover is provided with a forwardly and upwardly extending flange 146 bulged inwardly toward the middle of the trough for directing any heaped material in the bowl under the cover.

Suitable scrapers secured to the cover and to the frame may project into the trough for releasing adhering meat from the walls of the trough and for directing the meat laterally in the trough for operation thereon. Such scrapers are usual and are not shown.

The direction of rotation of the cutters is shown by the arrow $a$ and the direction of rotation of the bowl is shown by the arrow $b$.

The theory of the cutting action of the rotating cutters on the meat in the bowl is that the cutters act on the meat in the trough as the trough with the meat therein moves under the cutters, the regular angular progression of the positioning of the blades aiding in such feeding movement. It has been found, however, that there is a tendency for the meat to be arrested or slowed in its feeding movement and to form a rotating body or masses at the infeeding end of the set of cutter blades and for the meat to roll in the bowl in advance of the blades at the forward or infeeding side of the comb. In order to relieve or counteract in whole or in part such rolling or swirling of the material and to aid in the feeding movement thereof with the bowl, I have provided means whereby a space is formed at the infeeding side of the comb into which the outer enveloping part of the revolving or swirling bodies or masses of the meat may be pinched to thereby form a brake upon such rotation or swirling of the bodies or lumps of meat, and to cause a feeding friction between the bowl and the meat to induce a feeding movement of the meat with the bowl.

This is accomplished in the present exemplification by making the feeding-in tongue 103 of the comb movable for forming a space 148 in advance of the cutters, if it is found that there is a faulty feeding movement of the meat in the bowl. This movable tongue is shown as having slidable endwise movement between the side of the base of the comb and the side wall of the transverse opening 95 and its shallow extension 106, and between the bottom of said hollow extension and the comb cap 111 (Figs. 1, 2, 3 and 4).

The movable tongue is provided with a handle 149 for manipulation of the same. It has a laterally extending wing 150 received in a rabbet 151 in the base of the comb and has a guide rod 152 extending inwardly from said wing, the guide rod being slidable in a bearing 153 in the downwardly extending rear wall 154 of the base of the comb. Its rear end is shown threaded in the wing 150, a limiting collar 155, adjustably secured to the guide rod, limiting the outward movement of the movable tongue.

The tongue may be moved outwardly to desirable extent, depending on the character, solidity and moisture content of the meat and its tendency to roll or lag in its feeding movement. The tongue automatically remains in any desired position in which it is placed. As soon as proper feeding action of the meat has again begun, the tongue may be moved forwardly to its normal position.

The inner end of the comb is provided with a locating pin 156 in the end of one of its tongues which contacts with one of the collars on the cutter shaft, these collars preferably having outer cylindrical peripheries so that rotation of the collar with relation to the pin is not detrimental, the clamping of the clamp bolt 115 for the comb, however, positioning the comb preferably in such manner that the inner end of the locating pin is relieved of direct contact with its positioning collar.

The annular trough of the bowl is shown surrounding a central opening 161 to form an inner discharge for the trough. The wall of the opening is extended as a depending wall 162, to direct the discharge from the trough (Figs. 1, 5 and 6).

In the form shown the trough is provided with an outer peripheral rim 163 and an inner peripheral rim 164, and means are provided for discharging the cut meat either inwardly or outwardly from the trough. The inner rim and the outer rim are shown of substantially equal heights and the trough as having a cross-sectionally arcuate bottom which is preferably a sector of a circle. The cutter blades are shown of scimiter form, and their cutting paths are transverse to the trough, their cutting edges coacting with the bottom of the trough for cutting the meat, and the comb acting to arrest a rising tendency of the meat and to coact with the blades for cutting the meat, the infeeding body of meat fed by the rotative action of the trough crowding the meat between and past the knives and past the out-feeding end of the set of blades for again moving with the bowl.

When the material has been properly cut, comminuted or minced, it is ready to be discharged from the bowl, and in the form shown the discharge may be to the inside or to the outside of the trough. When discharged to the inside, it is caused to move through the opening 161 and be discharged therefrom into the suitable receptacle 25.

A scraper 165 is provided for the inner discharge. It is shown as a strip adjustably secured to the forward face of the cover, as by means of bolts 166 passing through enlarged holes in the scraper, and as having a scraper edge 167 coacting with the upper face of the inner rim of the bowl, and an upright scraping edge 168 coacting with the inner face of the wall of the opening and projecting downwardly throughout substantially the extent of said wall. This structure extends inwardly tangentially to said faces for directing the material through said opening during rotation of the bowl.

If it is desired to discharge the material to the outside of the trough, a discharge spout 171 is provided. This discharge spout has a downwardly outwardly sloping shelf 172, end walls 173, 174, and an inner upright securing wall 175, provided with elongated slots 176 through which bolts 177 extend, the bolts being threaded into the wall of the housing for clamping the spout in desired position to the frame about the bowl, the slots being perferably wide enough to permit vertical adjustable positioning of the spout (Figs. 1, 1a, 5 and 8).

An adjustable scraper 178 is provided at the inside of the spout at its out-feeding end to aid in directing the meat into the spout and having a scraper face 179 for scraping the upper face of the outer rim of the bowl and a contact edge 180 for scraping the outer peripheral face of said rim.

The discharge spout has an inwardly extending flange 183 having an inner edge 184 which extends into an annular grease groove 185 between the bowl and the frame. This inner edge is of arcuate form having a greater radius than the radius of the arc on which the inner wall 175 is formed, so that the flange tapers inwardly into the groove from its respective ends toward its middle and has a tendency to push the grease into the groove during rotation of the bowl. Vertical adjustment of the spout causes close contact between the lip and the bowl to prevent mingling between the lubricant and the meat and meat juices. The spout is adjustably secured to the housing in such manner as to adjust it into desired angular relation to the bowl and to the unloader employed for directing the meat from the bowl into the spout.

Unloading means are provided for selectively directing the material in the trough inwardly or outwardly, respectively, into the inner discharge or the outer discharge from the bowl. I prefer to employ a rotary unloader for the purpose and to selectively rotate the unloader in either of opposite directions for directing the material in the bowl inwardly or outwardly selectively into the respective discharges (Figs. 1, 5, 8, 9 and 11). Such a rotary unloader is exemplified as a rotating disk 191, suitably secured to a hub 192, having a reinforcing backing for said disk, shown as a spider 193 extending from said hub and having an annular rim 194 against which the outer portion of the disk is supported. The hub has collars 195, 196 threaded thereon, the disk having a central hole received over said hub and the margin of said hole being clamped between said collars in suitable position lengthwise of the hub, so that the outer peripheral portion of the disk shall have proper coaction with said rim 194.

The hub is mounted on a shaft 197, rotating in a tubular portion 198 of a pivoted arm 199. The outer end of this arm is provided with a head 200 rigidly secured to the arm and having a bearing 201 therein for the outer end of the shaft, the inner end of the shaft being journaled in a bearing 202 in the arm and being provided with a flange 203 bearing against the inner end of said bearing.

Laterally extending arms 205, 206 extend from said head, and at their outer ends have scrapers 207, 208 thereon. These scrapers are adjustably secured to said arms by threaded studs 209 extending from said scrapers, passing through slots 210 in said arms and having wing nuts 211 threaded thereon wherewith to clamp said scrapers to said arms in adjusted positions with relation to the scraper disk for properly scraping the meat contacting side of said disk.

These scrapers respectively have scraping edges 212, 213, which are projected in opposite directions with relation to opposite rotations of said disk, the scrapers being of outwardly slanting cross-sectional form with relation to said scraping edges for directing the scraped meat from said disk. These scraping edges are shown as directed downwardly toward the trough so that the meat adhering to the unloader during the unloading action in either direction will be scraped from the unloader. The unloader and scrapers cause the meat to rise with the ascending side of the unloader and to curl rearwardly with relation to the direction of the rotation of the trough, and laterally, inward or outward, depending on the direction of rotation of the unloader, to direct the flow of meat over the inner or outer rim of the trough, either for inward discharge or for outward discharge thereof at the unloading station at which said unloader is located, for discharging inwardly over the inner rim at the inner portion of such station or over the outer rim and the outwardly sloping shelf 172 at the outer portion of such station.

The hub 192 is clamped against the outer end of the inner raceway of the bearing 201 by a clamping nut 214 and a jam nut 215 over a threaded reduced outer portion of said shaft, to locate said bearing.

The shaft is provided with an outer reduced end 219 about which there is a handle 220 positioned endwise by a locating pin 221 threaded in said handle in countersunk relation and having an inner end received in an annular groove 223 in said reduced end of said shaft. The handle is rotatively loose about the shaft, so that the handle may be grasped by the hand for manipulating the unloader.

An unloader bracket 225 is secured to the housing 22. It is provided with pivot bearings 226. The unloader frame has a depending bracket portion 227 in which there are bearings 228. A pivot rod 229 is located in said bearings, being fixed to the bearings of the unloader arm so as to rotate with the pivotal movements of the unloader (Figs. 1, 8 and 14).

The bracket 225 is provided with extensions 230 shown as slanting downwardly and outwardly and having adjustable stops 231 therein, shown as bolts adjustable in threaded holes in said extensions, and provided with jam nuts 232 for holding the bolts in adjusted positions.

The depending portion 227 is provided with a shelf 235 for supporting a suitable reversible electric motor 236 in conjunction with which there is suitable reducing gearing 237 shown in tandem with the motor in the present exemplification, the delivery end of the motive mechanism having a shaft 238, between which and the unloader shaft there is a suitable coupling 239 for transmitting the rotations of the rotor in either direction to the unloader shaft.

A suitable switch box 241 is provided and contains suitable mechanism for controlling the direction of rotation of the unloader motor and the starting and stopping of the same (Figs. 1, 8 and 10). Thus a suitable reversing switch 242 is provided for controlling the direction of rotation of the motor, and consequently the direction of rotation of the unloader for inward or outward discharge of material from the trough. A normally closed electric switch 243 is provided for controlling the operation of the motor. The pivot rod of the unloader arm has a control arm 244 secured thereto, which moves with the movement of the unloader arm. When the unloader is in raised position, this control arm contacts the button 245 of the control switch 243 for opening said switch throughout the time that the unloader is raised. When the unloader is depressed into the trough, the control arm moves away from the button of the control switch for permitting the latter to close and thereby complete the circuit for the unloader motor, either through its forward or reverse rotation contacts in the reversing switch, as the same may be manipulated, for controlling the fact of rotation and the direction of rotation of the unloader. Rotation begins substantially when depressing of the arm begins, so that disk is at full speed upon contact with the meat, providing for a delayed full speed and full power operation of the electric motor between the time of energizing the electric motor at the beginning of the downward movement of the disk toward the trough and the time of full speed operation of the electric motor upon contact of the disk with the meat in the trough, thereby providing for acceleration of rotation in the motor and of said disk for full power actuation of the unloading disk upon entry thereof into the trough.

The unloader arm and its parts are so related that there is an overbalancing of the motor arm into release relation. The rotary unloader is shown at one end of said arm, and the electric motor for driving the same is located at the other end of said arm, with the pivot for said arm between the same, the motor end of the arm overbalancing the unloader end of the arm and causing the unloader to normally rise out of the trough. The adjustable stop 231 is provided for adjustably stopping the automatic movement of the unloader arm into retracted position with the control arm 244 thereof properly operating the control switch 243.

There is an anti-friction device between the supplemental frame and the bowl, shown as a raceway on the supplemental frame, having a lower substantially horizontal face 249 and an outer upright face 250 (Figs. 5 and 8b). The opposing raceway is on the bowl, and comprises an upper substantially horizontal face 251 and an inner depending face 252, which is substantially upright. These faces are annular. Balls 253 are located between said raceways, and rotatively support the bowl on said supplemental frame. The manners in which the faces of these raceways are directed are especially beneficial by providing substantially horizontal supporting faces for the anti-friction elements receiving the vertical stresses on the bowl and substantially vertical opposing annular faces receiving the horizontal stresses on the bowl, and for rotating the balls on axes which are radial and converging with relation to each other, converging below the bowl and toward the axis of rotation of the bowl, thus locating said axes in a conical plane.

The frame is provided with an upwardly extending annular tongue 256, and the bowl is provided with a downwardly opening annular groove 257, the walls of which are received about the tongue, there being lateral spaces 258, 259 between the tongue and said walls, and the upper edge of the tongue being spaced, as by the annular space 260, from the bottom of said groove, adjustments for maintaining such spaced relations being provided by means hereinafter described. An upper lubricating slot and lateral lubricating slots are thereby provided between the tongue and the walls of the groove, and these lubricating slots may be enlarged by grooves 261, located annularly in one or more of the walls of said slots, being shown located opposite each other in the tongue and in the outer depending wall 262 of the groove. The oppositely located grease grooves aid in forming a grease seal between the housing and the bowl, the grease filling said grooves and the space therebetween (Figs. 1a, 5 and 7).

Lubricant channels 263 communicate with said lubricating slots, being shown located in the tongues and having outer threaded branches 264 in which suitable lubricant nipples 265 are secured, and through which lubricants may be forced by any suitable force feeding means, so as to supply a lubricant into said slots, the lubricant being preferably a heavy grease. The mouths 266 of the lubricating slots preferably discharge into the upper annular slot 260. The lower ends of said side slots 258, 259 may be provided with oppositely opening annular mouths 185, 268, the walls of which are located respectively as shoulders on the said housing at the base of said tongue and as shoulders on said bowl at the lower ends of the lateral walls of said slots.

A lubricant channel 269 (Fig. 8b) communicates with the friction reducing bearing between the supplemental frame 28 and the bowl, its feed-in mouth being shown as discharging into the lower raceway thereof. A feed pipe 270 for the lubricant, such as grease, extends therefrom through an enlarged hole 270a in the inwardly extending flange of the housing 22, and is provided with a lubricant feed nipple 270b.

The tapering flange or lip 183 of the discharge spout may extend slightly into said outer annular mouth or grease groove 185, and is positioned against the upper wall of said mouth on the bowl for forming a tight joint with said bowl (Figs. 1, 1a and 8), this construction aiding in maintaining the grease within the groove 185 and preventing its leaking down the outer periphery of the housing 22, and preventing intermingling between the meat and the meat juices and the lubricant, as hereinbefore explained.

Adjustments are provided for the supplemental frame for adjusting the bowl vertically with relation to the cutting paths of the knives, and for locating the rims of the bowl into close connection with the cover so as to form close joint therewith and prevent escape of meat and meat juices from the bowl, and for proper relation between the lubricant passages at the tongue and groove connections between the bowl and the frame. Radial adjustments are also provided for said supplemental frame for adjusting the axis of rotation of the bowl for aiding in proper drive relation between the worm and the worm wheel and proper lateral positioning of the bowl at the lubricating passages between it and the frame and for proper cutting relation between the cutting paths of the blades and the trough.

Vertical adjustment is provided for the supplemental frame by means of adjusting bolts 271 passing through enlarged holes 272 in the flanges 273 of the respective legs of the main frame and threaded into the lower inwardly extending flange of the housing of the main frame (Figs. 5 and 8), the upper ends of the bolts being received in recesses 274 of greater diameter than the diameter of the upper ends of said bolts for permitting radial adjustment of said supplemental frame. Each of the bolts is provided with a jam nut 275 for holding the bolt in adjusted position.

The depending flange 276 of the supplemental frame has adjusting bolts 277 threaded therein, arranged to contact the inner edge of the lower inwardly extending flange of the housing of the main frame and thereby adjusting said supplemental frame radially and in lateral directions with relation to the main frame for adjusting the axis of rotation of the bowl. Each of these adjusting bolts is provided with a jam nut 278 for holding the same in adjusted positions.

The vertical and horizontal adjusting means may be each three in number, equally distanced about the circumference of the supplemental frame for making three point adjustments in each case.

The depending wall 262 directs any meat juices from the bowl downwardly past the grease groove 185 (Figs. 5, 7 and 8b), and the depending flange 276 overlaps the inner end of the lower flange of the housing 22 to form an interrupting joint 280 to arrest the passage of hot flushing water under pressure into the annular space 281 between the housing 22, the supplemental frame 28 and the bowl, the lapping joint 282 formed between the depending flange 283 of the bowl and the upper inner periphery of the supplemental frame arresting the passage of such hot flushing water into said annular space and to the grease imbedded ball bearing between the bowl and the supplemental frame. This ball bearing forms a grease joint which acts in conjunction with the grease joint between the tongue 256 and the groove 257 in maintaining said annular space 281 clean.

The inner opening 161 may be temporarily closed (Figs. 5a and 8a) by a removable closure 285 while charging the bowl with meat to be cut, to prevent such uncut meat from dropping through said inner opening. The closure may rest on the upper end of the wall of the inner opening 161, and be provided with a handle 287 for manipulating the same. Any charged meat which may drop on the closure may be wiped by a suitable knife or blade into the trough. The closure is removed before starting the cutting operation of the machine.

In operation, the bowl is rotatable in the main frame and has an annular material trough in which a set of rotary cutters rotate with cutting paths which are transverse to said trough. The axes of rotation for the driving means for the bowl and the cutter are all located above the horizontal plane in which the lower end of the bowl is located, and an electric motor is adjustably mounted on a cover covering the rear portion of the bowl, so as to provide proper tension to flexible driving connections between the motor and the cutter shaft, and at the same time the frame is so constructed that a material receptacle may be rolled or otherwise positioned under the middle of the bowl for receiving material discharged inwardly from the trough of the bowl, or the receptacle may be placed at the outer rim of the bowl for receiving material discharged outwardly from the chute.

Both vertically and horizontally acting adjusting means of novel and extremely simple, economical and readily accessible structure are provided for proper coaction between the bowl and the parts coacting therewith.

The material being cut moves with the rotating bowl, and means are provided at the infeeding end of the set of cutters to control the feeding movement of the material in the bowl and prevent its balling or locally rotating or swirling at the infeeding end of the set of cutters, insuring movement of the material itno the field of action of the cutters and feeding movement of the meat by the bowl past the cutters, accomplished specifically by movement of an infeeding tongue at the infeeding end of the comb coacting with the cutter blades.

Unloading means are provided for the cut or comminuted meat in the bowl, either selectively inwardly or outwardly, a rotary unloader comprising a rearwardly dish-shaped unloading disk being provided and having means in connection therewith for rotating in either of opposite directions for discharging the material in the trough inwardly or outwardly as the trough is rotating, the operation of said rotary unloader being automatically controlled by its active and retracted positions, as by providing an automatically controlled switch for an electric motor for rotating the unloader.

The unloader is further mounted on an overbalanced arm, so that the unloader is automatically retracted into inactive position, and when so retracted having its rotations stopped, the pivot of the unloader frame being located between the unloader at one end thereof and the electric motor for operating the same at the other end thereof.

Novel means are also provided for centrally locating the bowl for proper coaction between the various operating parts and the bowl, and the bowl is also mounted on anti-friction bearing means, the resistances to stresses in which are vertical to resist the bearing and weight stresses of the bowl, and horizontal to resist the driving and shifting stresses of the bowl.

In my improved device the outer discharge and the inner discharge may be provided for different characters of meat. The cutting operation takes place rapidly in my improved device, in fact, more rapidly than the time consumed by subsequent operating steps upon the meat. For instance, the mixing operation on the cut meat is substantially slower than the cutting operation. The outer discharge may therefore be arranged for delivery into a suitable mixing machine, and intermediate batches of meat of other characters may be cut during the mixing of the first-named batch and discharged through the inner discharge of my improved device for other subsequent operations thereon, so that my improved device may be substantially continuously employed.

My improved construction provides a compact and simple mechanism in which the parts are associated in economical manner for structure and assembly, and in which the operative devices are placed for most economical and convenient service, provides a construction in which the meat is free from human contact, and in which the discharge may take place either inwardly or outwardly with relation to the trough.

I claim:

1. In a cutting machine of the character described, the combination of a rotary bowl provided with a central discharge and an outer peripheral discharge separated in radial direction and having upper discharge rims of sufficient heights to support the material in the bowl at said discharges during rotation of the bowl while said material is being cut and respectively extending entirely around said central discharge and entirely around the outer periphery of the bowl, means for rotating said bowl, and reversible unloading means insertable in said bowl to direct the contents of said bowl during rotation of said bowl and by reversals of said reversible unloading means selectively over said respective rims and into said respective discharges, whereby the discharged material is received at different points from said discharges.

2. In a cutting machine of the character described, the combination of a rotary bowl provided with an inner discharge rim entirely surrounding an inner discharge and an outer discharge rim extending entirely around the outer periphery of the bowl for outer discharge, means for rotating said bowl, said rims being of sufficient heights to support the material in the bowl during rotation of the bowl while said material is being cut, said inner discharge rim terminating upwardly in an upwardly presented material contacted marginal face whose width extends radially of said bowl, and unloading means to discharge the contents of the bowl during rotation of the bowl selectively at separated points over said respective rims and in contact with said upwardly presented marginal face when said contents are discharged inwardly.

3. In a cutting machine of the character described, the combination with a rotary bowl provided with a material trough and rotatable in a given direction, a rotary unloader comprising a rotary unloader hub, a material contacting hollow dished disk with the hollow thereof presented rearwardly with relation to the direction of rotation of said bowl and insertable in said trough during rotation of said bowl, a supporting structure therefor inside the hollow of said disk and supported by said hub, said supporting structure having an outer annular margin coacting with the outer annular dished margin of said disk and coacting with the latter to support and center the same with relation to the axis of rotation of said hub adjusting means between said hub and said disk to axially relatively adjust said hollow dished disk and said supporting structure on said hub to adjust the supporting and centering relation between said outer annular margin of said hollow dished disk and said outer annular margin of said supporting structure.

4. In a cutting machine of the character described, the combination of a main frame, a rotary bowl journaled therein and provided with a meat trough, said frame and said bowl having an annular grease joint between them provided with an annular mouth, and a discharge spout for said bowl provided with a lip received in said annular mouth to locate the same with relation to said bowl, and said lip provided with an inner wiping face inclined inwardly lengthwise of said outer annular mouth to wipe the grease therein inwardly.

5. In a cutting machine of the character described, the combination of a main frame, a rotary bowl having a cross-sectionally arcuate material trough and provided with a ring gear for rotating the same, cutter blades rotatively supported by said main frame, said cutter blades having cutting paths crosswise of said trough and coacting with the wall of said trough to cut the material, an annular normally stationary intermediate laterally and vertically adjustable frame on which said rotary bowl is supported and rotates, adjusting means between said main frame and said intermediate frame for adjusting said intermediate frame to elevation and thereby adjusting the elevation of said rotary bowl for adjusting the coactive cutting relation between said wall of said trough and said cutting path of said cutter blades, and lateral adjusting means between said main frame and said intermediate frame whereby to combinedly laterally adjust said intermediate frame and said bowl for adjusting the position of the axis of rotation of said rotary bowl.

6. In a meat cutting machine, the combination of a frame, a rotary bowl therein, a cover for a rear portion of said bowl secured to said frame, a rotary cutter shaft, a set of cutters thereon operating in said bowl, said cover provided with an opening in which said cutters rotate, bearings on said cover for said cutter shaft solely at one side of said opening, said cutter shaft having an overhanging end in said opening on which said cutters are secured, said overhanging end of said cutter shaft provided with an arresting face, a movable wrench coacting with said arresting face and having a part coacting with said cover to arrest rotation of said wrench and said cutter shaft, and a movable hood arranged to close over said cutters to close said opening, and said wrench forming an obstruction to said hood to arrest the closing of said hood when said wrench is in operative position to so arrest rotation of said cutter shaft.

7. In a meat cutting machine, the combination of a frame, a rotary bowl therein, a cover for a rear portion of said bowl secured to said frame, a rotary cutter shaft, a set of cutters thereon, said cover provided with an opening in which said cutters rotate, bearings on said cover for said cutter shaft solely at one side of said opening, said cutter shaft having an overhanging end in said opening on which said cutters are secured, said opening having a bay in one wall thereof in said cover in line with said overhanging end of said cutter shaft, said overhanging end of said cutter shaft provided with an arresting face in said bay, and a movable wrench coacting with said arresting face and provided with shoulders coacting with the walls of said bay to hold said cutter shaft non-rotative, and a movable hood arranged to close over said cutters to close said opening and said bay, said wrench forming an obstruction to said hood to arrest the closing of said hood whilst said wrench is in operative position to so arrest rotation of said cutter shaft, and said wrench being movable into unobstructing position whereby to release said cutter shaft.

8. In a meat cutting machine, the combination of a frame, a rotary bowl therein, a cover for a rear portion of said bowl secured to said frame, a rotary cutter shaft, a set of cutters thereon, said cover provided with an opening in which said cutters rotate, bearings on said cover for said cutter shaft solely at one side of said opening, said cutter shaft having an overhanging end in said opening on which said cutters are secured, said opening having a bay in one wall thereof in said cover in line with said overhanging end of said cutter shaft, said overhanging end of said cutter shaft provided with an arresting face in said bay, and a movable wrench coacting with said arresting face and provided with shoulders coacting with the walls of said bay to hold said cutter shaft non-rotative, and the outer end of said wrench coacting with the end wall of said bay and said wrench provided with an end obstructing part to arrest endwise movement of said cutter shaft, and a movable hood arranged to close over said cutters to close said opening and said bay, said wrench forming an obstruction to said hood to arrest the closing of said hood whilst said wrench is in operative position to so arrest rotation of said cutter shaft, and said wrench being movable into unobstructing position whereby to release said cutter shaft.

9. In a meat cutting machine, the combination of a frame, a rotary bowl having an annular meat trough, there being a substantially closed annular space between said frame and said bowl, a ring gear on said bowl for rotating said bowl located in said annular space, a friction reducing bearing between said bowl and said frame formed as a grease joint at one side of said annular space and a lap grease joint between said rotary bowl and said frame at the other side of said annular space to arrest passage of detrimental material into said annular space.

10. In a meat cutting machine, the combination of a main frame, a supplemental frame, a rotary bowl having an annular meat trough, there being a substantially closed annular space between said main frame, said supplemental frame and said bowl, friction reducing raceways and friction reducing elements therefor between said supplemental frame and said bowl at one side of said annular space for rotatively supporting said bowl, and a ring gear on said bowl in said annular space, said raceways forming an annular grease joint, the outer margin of said bowl and said main frame having a lap grease joint therebetween at the other side of said annular space, and said main frame, said supplemental frame and said bowl having lap joints between them at said first-named side of said annular space, and constructed and arranged for arresting passage of deleterious material into said annular space.

11. In a meat cutting machine, the combination of a main frame, a supplemental frame, a rotary bowl having an annular meat trough, there being a substantially closed annular space between said main frame, said supplemental frame and said bowl, an annular friction reducing bearing between said supplemental frame and said bowl in the margin of said annular space for rotatively supporting said bowl, and a ring gear on said bowl in said annular space, the outer margin of said bowl and said frame having a lap joint therebetween, and said main frame, said supplemental frame and said bowl having lap joints between them at the inner side of said annular space, and constructed and arranged for arresting passage of deleterious material into said annular space.

12. In a cutting machine of the character described having a discharge station, the combination of a rotary bowl having an annular material cutting trough and provided with a central discharge and an outer peripheral discharge separated in radial direction at the respective sides of said trough and having upper discharge rims of sufficient heights to support the material in said trough at said discharge station while being cut and during rotation of said bowl, means for rotating said bowl, rotary cutter blades operating in said trough crosswise of said trough and spaced angularly from said discharge station, said discharge rims terminating upwardly respectively at said discharge station in upwardly presented exposed material contacted marginal faces, said rims and said marginal faces respectively extending entirely around said central discharge and entirely around the outer periphery of said bowl, and unloading means insertable into said trough at said discharge station constructed and operative to selectively discharge the material in said trough during rotation of said bowl in opposite directions over said respective upper discharge rims in contact with said respective upwardly presented exposed material contacted marginal faces.

13. In a cutting machine of the character described having a discharge station, the combination of a rotary bowl having an annular material cutting trough and provided with a central discharge and an outer peripheral discharge separated in radial direction at the respective sides of said trough and having upper discharge rims of sufficient heights to support the material in said trough at said discharge station while being cut and during rotation of said bowl, means for rotating said bowl, rotary cutter blades operating in said trough crosswise of said trough and spaced angularly from said discharge station, said discharge rims terminating upwardly respectively at said discharge station in upwardly presented exposed material contacted marginal faces, said rims and said marginal faces respectively extending entirely around said central discharge opening and entirely around the outer periphery of said bowl, unloading means insertable into said trough at said discharge station constructed and operative to selectively discharge the material in said trough during rotation of said bowl in opposite directions over said respective upper discharge rims in contact with said respective upwardly presented exposed material contacted marginal faces, and stationarily positioned scrapers at said discharge station coacting with said respective upwardly presented exposed material contacted marginal faces to scrape the material therefrom.

14. In a cutting machine of the character described, the combination of a main supporting housing, a rotary bowl provided with an annular cross-sectionally arcuate material trough, rotary cutting means having an arcuate cutting path operating in said trough crosswise of said trough, said rotary bowl provided with a rotatable ring gear for rotating the same, an annular normally stationary vertically and laterally adjustable supplemental supporting frame located between said main supporting housing and said bowl, friction reducing bearing means between said supplemental supporting frame and said bowl on which said bowl is supported and rotates, and vertical and lateral adjusting means acting on said supplemental supporting frame to vertically and laterally adjust said supplemental supporting frame and with it said friction reducing bearing means and said bowl in said main supporting housing to adjust said annular cross-sectionally arcuate material trough with relation to the cutting path of said cutting means.

15. In a cutting machine of the character described, the combination of a rotary bowl having an annular cross-sectionally arcuate material trough, a cover for the rear portion of said bowl provided with a transverse opening into said trough, a series of rotary blades operable in said trough and in said opening and having arcuate cutting paths transverse to and coacting with said trough and arranged in endwise relation about a common axis and having a feeding-in end for the material in said trough, a comb in said opening having spaced material contacted teeth coacting with said rotary blades, said cover and said comb forming a substantially continuous top wall for said trough in substantially the level of the top of said trough and extending in the direction of rotation of said bowl adjacent to said rotary blades, said top wall acting to hold the material in said trough, means to rotate said bowl to feed the material in said trough toward said feeding-in end of said series of rotary blades under said top wall into the sphere of cutting action of said blades for being cut thereby, and means whereby to selectively provide a sub opening in said top wall at said feeding-in end of said series of cutters to receive material thereinto by the feeding pressure of said material under said top wall and the rotary action of said cutters, for retarding surface movement of the material whereby to retard local rotation and swirling in said material.

16. In a cutting machine of the character described, the combination of a rotary material bowl having an annular crosswise arcuate material trough about the axis of rotation of said bowl, a cover for the rear portion of said bowl to hold the material in said trough and provided with a transverse opening, rotary cutter blades operable in said trough and said opening and having arcuate cutting paths transverse to said trough, means for rotating said material bowl in a given direction for feeding-in movement of the material in said trough toward one end of said rotary cutter blades, said one end of said rotary cutter blades being the feeding-in end of said blades, said cutter blades rotating in a direction to normally raise the material at one side of said trough, a comb in said opening coacting with said rotary cutter blades and with said cover forming a substantially continuous upper confining wall for the material in said trough at said one side of said trough, and a retarding wall at said feeding-in end of said cutter blades and control means therefor to selectively expose said retarding wall to material in said trough at said feeding-in end of said cutterblades to form retarding means for retarding surface movement of material by contact with said retarding wall to negative local rotation and swirling of the material.

17. In a cutting machine of the character described, the combination of a rotary material bowl having an annular crosswise arcuate material trough about the axis of rotation of said bowl, a cover for the rear portion of said bowl provided with a transverse opening, rotary cutter blades operable in said trough and said opening and having arcuate cutting paths transverse to and coacting with said trough, means for rotating said material bowl in a given direction for feeding-in movement of the material in said trough toward one end of said rotary cutter blades with said cutter blades rotating in a direction to normally raise the material at one side of said trough, a comb in said opening coacting with said rotary cutter blades, said cover and said comb being a substantially continuous upper confining wall for the material in said trough in substantially the level of the top of said trough at said one side of said trough, and means whereby to selectively provide a sub opening in said upper confining wall at said feeding-in end of said cutter blades to receive exuded material from said trough whereby the walls of said sub opening form retarding means for retarding surface movement of said exuded material by contact with said walls to negative local rotation and swirling at the feeding-in end of said rotary cutter blades.

18. In a cutting machine of the character described, the combination of a rotary material bowl having an annular crosswise arcuate material trough about the axis of rotation of said bowl, rotary cutter blades operable in said trough and having arcuate cutting paths transverse to said trough, a cover for the rear portion of said bowl provided with an opening transverse to said trough in which said cutter blades rotate, means for rotating said rotary cutter blades with an upward movement at one side of said trough, means for rotating said bowl to feed the material in said trough into the sphere of cutting action of said cutter blades toward one end of said cutter blades, and a comb at said one side of said trough coacting with said cutter blades, said cover and said comb forming a continuous top wall for said trough at said one side of said trough at substantially the level of the top of said trough to confine the material in said trough at said cutter blades during said cutting action, and said comb comprising a tongue at said one end of said cutter blades movable to move a portion of said top wall out of coactive relation with said material to form a space having walls between which a portion of said material is forced by said feeding and cutting actions to qualify the feeding movement of said material and thereby retard local rotation and swirling of said material.

19. In a cutting machine of the character described, the combination of a rotary material bowl having an annular crosswise arcuate material trough about the axis of rotation of said bowl, rotary cutter blades operable in said trough and having arcuate cutting paths transverse to said trough, a cover for the rear portion of said trough provided with an opening transverse to said trough in which said cutter blades rotate, means for rotating said rotary cutter blades with an upward movement at one side of said trough, means for rotating said bowl to feed-in the material in said trough into the sphere of cutting action of said cutter blades toward one end of said cutter blades, said opening having a transverse wall at said end, and a comb coacting with said cutter blades, said cover and said comb having a confining face to confine the material in said trough during said cutting action, said comb comprising an end tongue at the feeding-in end of said cutter blades movable endwise selective distances to move a portion of said confining face out of coactive relation with said material to form a space into which a portion of said material is forced by said feeding and cutting actions and having said transverse wall at one side thereof to qualify the feeding movement of said material and thereby retard local rotation and swirling said material.

20. In a cutting machine of the character described, the combination of a main supporting housing having a lower inwardly extending annular flange, a supplemental supporting frame having an outer annular margin above said inwardly extending annular flange and overlapping the latter outwardly, a rotary bowl having an annular crosswise arcuate material trough about the axis of rotation of said bowl, rotary cutters having arcuate cutting paths transverse to said trough coacting with said crosswise arcuate material trough to cut the material in the latter, said bowl extending radially outwardly beyond said supplemental supporting frame and having annular joint connection at its outer upper margin with said main supporting housing, said supplemental supporting frame having joint connections at its respective sides with said bowl and said inwardly extending annular flange respectively, and adjusting means between said inwardly extending annular flange and said supplemental supporting frame to adjust said bowl vertically and horizontally with relation to the arcuate cutting paths of said rotary cutters.

21. In a cutting machine of the character described, the combination of a main supporting housing having a lower inwardly extending annular flange, a supplemental supporting frame having an outer annular margin above said inwardly extending annular flange and overlapping the latter outwardly, a rotary bowl having an annular crosswise arcuate material trough about the axis of rotation of said bowl, rotary cutters having arcuate cutting paths transverse to said trough coacting with said crosswise arcuate material trough to cut the material in the latter, said bowl extending radially outwardly beyond said supplemental supporting frame and having annular joint connection at its outer upper margin with said main supporting housing, said supplemental supporting frame having joint connections at its respective sides with said bowl and said inwardly extending annular flange respectively, adjusting means between said inwardly extending annular flange and said supplemental supporting frame to adjust said bowl vertically and horizontally with relation to the arcuate cutting paths of said rotary cutters, there being an annular space between said main supporting housing and its lower inwardly extending annular flange and said supplemental supporting frame and said bowl which is substantially cross-sectionally closed by said first-named joint connection and said second-named joint connections, and said rotary bowl provided with a ring gear in said annular space to rotate said bowl.

22. In a cutting machine of the character described having a discharge station, the combination of a rotary bowl having an annular material cutting trough and provided with a central discharge and an outer peripheral discharge at the respective sides of said trough respectively having upper discharge rims at said discharge station for selective inward discharge and outward discharge thereover of the material in said trough, means for rotating said bowl, a cover for a portion of said trough angularly removed from said discharge station, rotary cutter blades operating in said cover and in said trough crosswise of said trough and spaced angularly from said discharge station, said discharge rims respectively extending entirely around said central discharge and entirely around the outer periphery of said bowl and having joint connection with said cover, and reversible unloading means insertable into said trough at said discharge station constructed and operative to selectively discharge the material in said trough during rotation of said bowl selectively in opposite directions by reversals of said reversible unloading means over said respective upper discharge rims selectively inwardly and outwardly selectively into said central discharge and said outer discharge.

23. In a cutting machine of the character described having a discharge station, the combination of a rotary bowl having an annular material cutting trough and provided with both a central discharge and an outer discharge at the respective sides of said trough at said discharge station, means for rotating said bowl continuously in a given direction, rotary cutter blades operating in said trough crosswise of said trough and angularly distanced about said rotary bowl from said discharge station, a reversible rotary dished unloading disk, means for rotating the same selectively in opposite directions, and mounting means for said disk to present the hollow side of said disk rearwardly with relation to the direction of rotation of said bowl and the other side of said disk to the material in the trough to move the material from said trough and wherewith to insert said disk into said trough at said discharge station, and constructed and operative during rotation of said bowl in said given direction and by selective reversals of direction of rotation of said disk to discharge the material in said trough in selective opposite directions selectively inwardly and outwardly respectively into said central discharge and said outer discharge.

24. In a cutting machine of the character described, the combination of a rotary bowl having an annular meat trough and an inner discharge opening and also arranged for discharge over the outer rim of said trough, rotary cutter blades operating in said trough crosswise of said trough, means for rotating said bowl, and reversible unloading means for the cut meat insertable into said trough and during rotation of said bowl to discharge the material in said trough selectively in opposite directions through said inner discharge opening or over said outer rim by selective reversals of said reversible unloading means.

25. In a cutting machine of the character described, the combination of a rotary bowl having an annular meat trough and an inner discharge opening and also arranged for discharge over the outer rim of said trough, rotary cutter blades operating in said trough crosswise of said trough, means for rotating said bowl, a rotary unloader normally located outside said trough and insertable into said trough, and means to selectively rotate said rotary unloader in opposite directions whereby upon such insertion of said rotary unloader into said trough during rotation of said bowl to discharge the material in said trough selectively in opposite directions at separated points through said inner discharge opening or over said outer rim.

26. In a cutting machine of the character described, the combination of a rotary bowl provided with a trough having an inner discharge and an outer discharge, means for rotating said bowl, rotary cutter blades operating in said trough crosswise of said trough, a reversible rotary disk unloader insertable into said trough and selectively reversely rotatable for discharging the material therefrom during rotation of said bowl selectively in opposite directions into said inner discharge and said outer discharge, a movable frame on which said reversible rotary unloader is journaled, and a scraper mounted on said movable frame and provided with oppositely acting scraping edges presented toward each other about the axis of said reversible rotary disk unloader and downwardly at opposite sides of the vertical plane in which the axis of rotation of said rotary disk unloader is located and coacting with said reversible rotary disk unloader selectively active to scrape material from said disk unloader during rotation in selectively opposite directions of said disk unloader.

OSCAR C. SCHMIDT.